United States Patent
Lee et al.

(10) Patent No.: US 8,280,403 B2
(45) Date of Patent: Oct. 2, 2012

(54) METHOD AND APPARATUS FOR LOCATION-BASED UPDATE OF CONTENT

(75) Inventors: Mi Sun Lee, Anyang-si (KR); Young Suk Lyu, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 104 days.

(21) Appl. No.: 12/943,416

(22) Filed: Nov. 10, 2010

(65) Prior Publication Data

US 2011/0111773 A1    May 12, 2011

(30) Foreign Application Priority Data

Nov. 12, 2009   (KR) .................. 10-2009-0109287

(51) Int. Cl.
*H04Q 7/20*   (2006.01)

(52) U.S. Cl. ............ 455/456.1; 455/414.1; 455/418; 709/217

(58) Field of Classification Search .......... 455/456.6, 455/414.1, 418; 709/217
See application file for complete search history.

(56) References Cited

U.S. PATENT DOCUMENTS

| | | | |
|---|---|---|---|
| 2005/0188078 A1* | 8/2005 | Kotzin et al. | 709/224 |
| 2007/0100960 A1* | 5/2007 | Eichstaedt et al. | 709/217 |
| 2009/0264111 A1* | 10/2009 | Bernard | 455/414.3 |
| 2010/0082526 A1* | 4/2010 | Wassingbo | 707/603 |
| 2010/0088333 A1* | 4/2010 | Takahashi | 707/765 |

* cited by examiner

*Primary Examiner* — Danh Le
(74) *Attorney, Agent, or Firm* — Jefferson IP Law, LLP (57) ABSTRACT

A method and apparatus for a location-based update of RSS content are provided. The method includes appointing place information for an update of content for each RSS URL at user equipment, acquiring location information about the user equipment selecting RSS content to be updated based on the place information when the acquired location information coincides with the appointed place information, and updating the selected RSS content.

12 Claims, 6 Drawing Sheets

METHOD AND APPARATUS FOR LOCATION-BASED UPDATE OF CONTENT

PRIORITY

This application claims the benefit under 35 U.S.C. §119(a) of a Korean patent application filed on Nov. 12, 2009 in the Korean Intellectual Property Office and assigned Serial No. 10-2009-0109287, the entire disclosure of which is hereby incorporated by reference.

BACKGROUND OF THE INVENTION

1. Field of the Invention

The present invention relates in general to a content update based on Really Simple Syndication or Rich Site Summary (RSS) formats. More particularly, the present invention relates to a method and apparatus for a location-based update of RSS content in which a selective update of RSS content is allowed using location information about user equipment.

2. Description of the Related Art

RSS (most commonly expanded as Really Simple Syndication or Rich Site Summary) is a standardized format for publishing or aggregating content based on eXtensible Markup Language (XML) and is generally used to provide frequently updated content to website users. Providers benefit by publishing content automatically, and users benefit by subscribing to timely updates from favored websites or by aggregating content from many sites into one place.

Single RSS content is often called a feed and includes full or summarized text and XML-based metadata such as publishing dates and authorship. RSS content can be read using software called an RSS reader. A user can subscribe to updated content by entering a site Uniform Resource Locator (URL) into the RSS reader. Registered sites provide updated RSS content regularly or at a user's request. The RSS reader downloads RSS content, analyzes a corresponding XML document, and shows the RSS content to the user.

Nowadays such RSS services are widely used through some kinds of RSS reader programs. Additionally, as mobile devices equipped with RSS readers are launched on the market, RSS services are increasing in both wired or wireless environments.

However, a conventional RSS service is restricted to a time-based update of RSS content, thus often causing user's inconvenience and limited usage. In these days users may usually want different updated information at different places. For example, users may want to obtain information about childcare, living, news, or weather at home; information about prices or discounts at stores; and information about best-sellers at a bookstore.

SUMMARY OF THE INVENTION

An aspect of the present invention is to address at least the above-mentioned problems and/or disadvantages and to provide at least the advantages described below. Accordingly, an aspect of the present invention is to provide a method and apparatus for updating RSS content, based on a user's location.

Another aspect of the present invention is to provide a method and apparatus for selecting RSS content to be updated, depending on place information coinciding with location information about user equipment, and then updating the selected RSS content regularly or at a user's request.

In accordance with an aspect of the present invention, a method for updating RSS content is provided. The method includes appointing place information for an update of content for each RSS URL at user equipment, acquiring location information about the user equipment; selecting RSS content to be updated based on the place information when the acquired location information coincides with the appointed place information, and performing an update of the selected RSS content.

In accordance with another aspect of the present invention, an apparatus for updating RSS content is provided. The apparatus includes a memory unit for storing an RSS reader, a URL address of an RSS server, and at least one place information appointed for each URL of the RSS server, and a control unit for acquiring location information about user equipment, for determining whether the acquired location information coincides with the appointed place information, and for sending a request for an RSS content update to the URL address of the RSS server based on the place information.

In accordance with another exemplary embodiment of the present invention, an apparatus is provided. The apparatus includes a storage unit for storing an RSS reader, a control unit for acquiring location information identifying a current location of the apparatus, for determining whether the location information corresponds with previously stored place information, and when the location information corresponding with the previously stored place information, for requesting a RSS content update via a URL address corresponding to the previously stored place information, and a display unit for displaying the updated RSS content retrieved from the URL address via the RSS reader.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention provide an enhanced way to update, based on location as well as time, RSS content of specific sites registered in the RSS reader of user equipment. Updated content may include new content, supplemental content, or changes to previously downloaded content.

For instance, a user may desire to obtain RSS content updates containing information about childcare, living, news, or weather at home; information about prices or discounts at stores; and information about best-sellers at a bookstore. In this case, update places may be designated with an <updatePlace> tag for each URL registered in the RSS reader. The respective update places, such as "home", may be distinguishable from each other. When located at one of the designated places or in response to a user's request, the user equipment may perform an RSS content update through the RSS reader.

Figure 1:
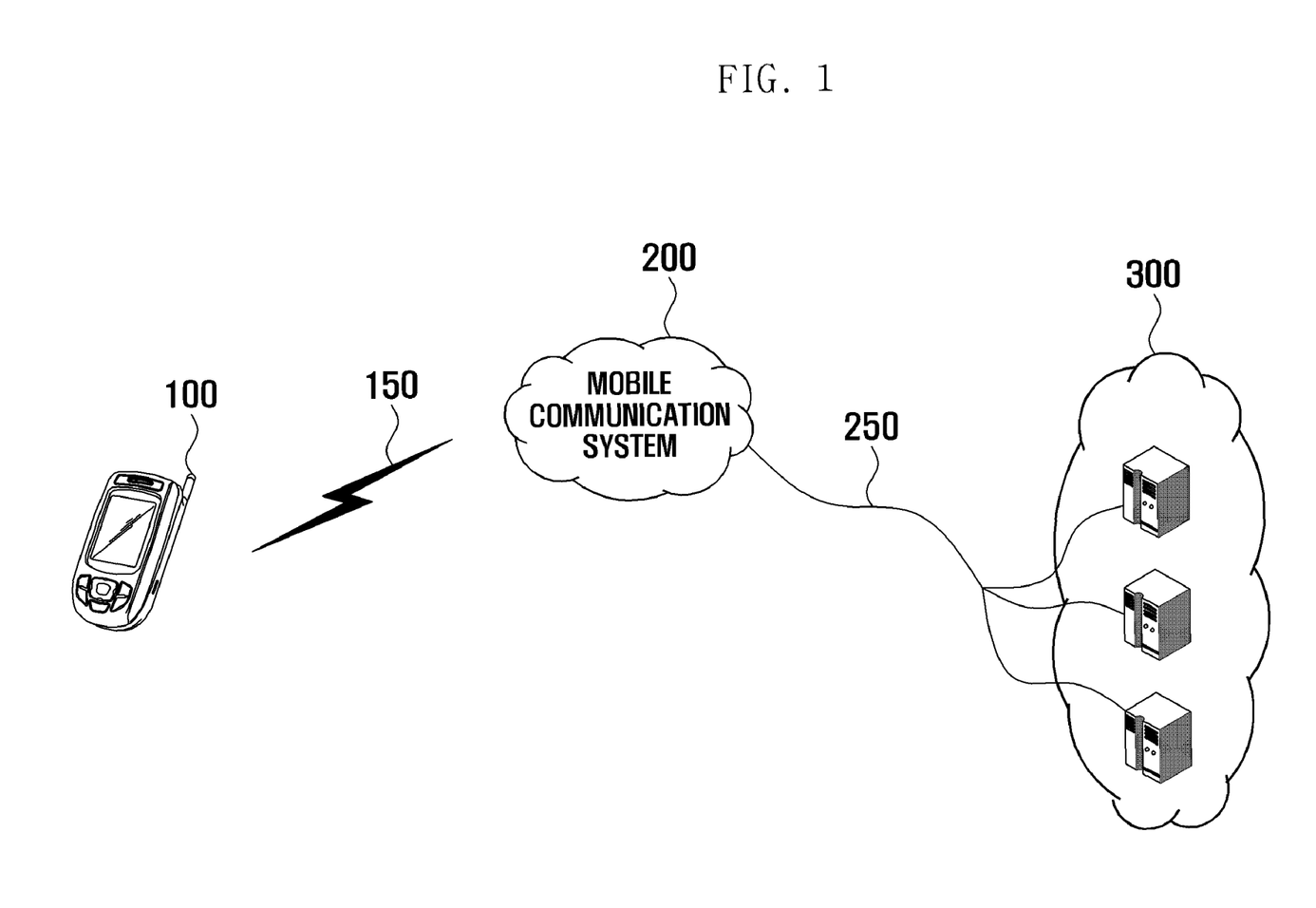
FIG. 1 is a schematic view illustrating a system used for a location-based update of RSS content in accordance with an exemplary embodiment of the present invention.

FIG. 1 is a schematic view illustrating a system used for a location-based update of RSS content according to an exemplary embodiment of the present invention.

Referring to FIG. 1, the RSS content update system may include user equipment 100 that has an RSS reader, a mobile communication system 200 that establishes a communication channel 150 with the user equipment 100, and at least one RSS content server 300 that establishes a communication channel 250 with the mobile communication system 200 and transmits update information of specific content selected by the RSS reader to the user equipment 100.

The user equipment (UE) 100, also referred to as a mobile station, a mobile device, and the like, includes the RSS reader. The user equipment 100 may store an URL address of a specific site, namely the URL of the RSS content server 300, for an RSS content update. Such URL addresses may be registered in the RSS reader. The user equipment 100 may be wirelessly connected to the mobile communication system 200 via the communication channel 150. The user equipment 100 may acquire its own location information by itself or from the mobile communication system 200. The user equipment 100 may perform a location-based update of RSS content based on predetermined place information as well as the acquired location information.

The mobile communication system 200 includes various elements, such as a Base Station (BS) for sending and receiving a signal to and from the user equipment 100, a Base Station Controller (BSC) for controlling the BS, a Mobile Switching Center (MSC) for controlling the BSC, a message service center for administering SMS and MMS of the user equipment 100, an accounting center for keeping financial accounts, a Home Location Register (HLR) for providing location information about the user equipment 100 and processing handoff, an RSS gateway for processing matters related to RSS content updates of the user equipment 100, and the like. As will be understood by those skilled in the art, the mobile communication system 200 forms the communication channel 150 with the user equipment 100 and processes transmission of voice, image, and data. The RSS gateway may store predetermined place information to be offered in response to the request of the user equipment 100 and also may acquire location information about the user equipment 100 from a location server. The RSS gateway may determine whether the acquired location information coincides with the predetermined place information and may perform a sequence in connection with RSS content updates. Related descriptions will be given later.

The RSS content server 300 may have a variety of updated content, including text, moving images, still images, and the like. The RSS content server 300 may be connected to the mobile communication system 200 via a wired or wireless Internet network. The RSS content server 300 may send and receive data by forming the communication channel 250 with the mobile communication system 200. The RSS content server 300 transmits update information to the user equipment 100 according to location-based or time-based transmission cycles of update information appointed by the user equipment 100 using the RSS reader. Update information may be sent to the RSS reader of the user equipment 100 when new update information is generated in the RSS content server 300, or based on places and/or times appointed by the RSS reader, or when the RSS reader of the user equipment 100 is activated.

Figure 2:
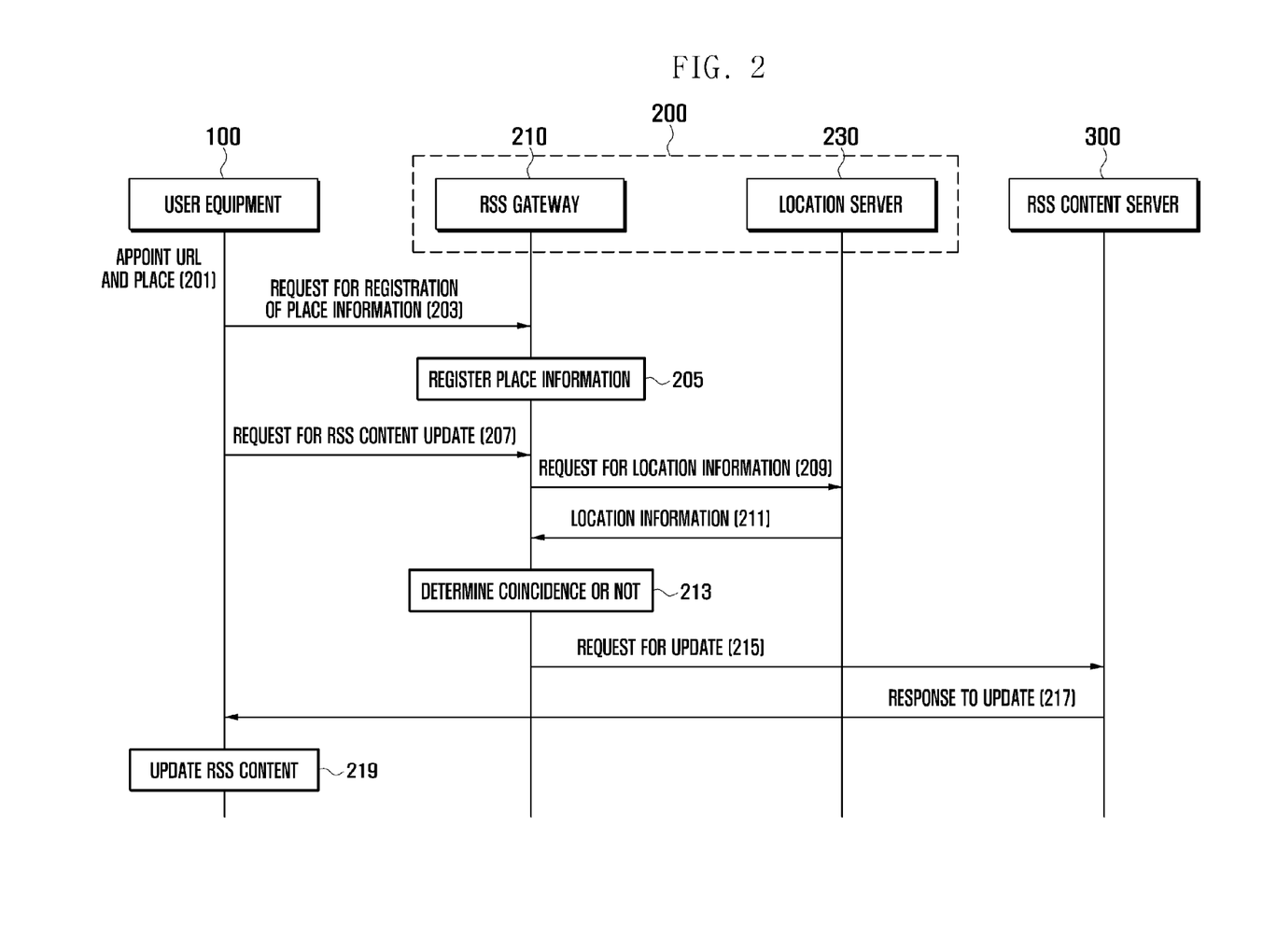
FIG. 2 is a flow diagram illustrating a method for a location-based update of RSS content in accordance with an exemplary embodiment of the present invention.

FIG. 2 is a flow diagram illustrating a method for a location-based update of RSS content according to an exemplary embodiment of the present invention.

Referring to FIG. 2, a process is shown of providing a location-based RSS content update service in the user equipment 100, the RSS gateway 210, the location server 230, and the RSS content server 300. The process includes appointing places for each RSS URL in steps 201 and 203, registering place information in step 205, requesting a location-based update of RSS content in step 207, acquiring location information about the user equipment 100 in steps 209 and 211, comparing the acquired location information with the registered place information in step 213, requesting an RSS content update from a specific URL site containing RSS content to be updated when the location information coincides with the place information in step 215, and performing an RSS content update for the user equipment 100 in steps 217 and 219. The method may further include displaying RSS content update information through the RSS reader after RSS content is updated.

In step 201, the user equipment 100 having the RSS reader appoints a place for receiving an update for each RSS URL. For each RSS URL, the user equipment 100 may select content to be updated, designate place information for updating the selected content, and then save the selection and the place information in the RSS reader. For example, the user equipment 100 may specify the selection and the place information as "RSS URL: Site A, RSS Content: Content A, Location: Home".

TABLE 1

```
<item>
    <title>Star City</title>
    <link>http://liftoff.msfc.nasa.gov/news/2003/news-starcity.asp</link>
    <updatePlace> Home </updatePlace>
    <description>How do Americans get ready to work with Russians
    aboard the International Space Station? They take a crash course in
    culture, language and protocol at Russia's Star City.</description>
    <pubDate>Tue, 03 Jun 2003 09:39:21 GMT</pubDate>
    <guid>http://liftoff.msfc.nasa.gov/2003/06/03.html#item573</guid>
</item>
```

The user equipment 100 sends a request for registration of place information to the RSS gateway 210 in step 203. The RSS reader of the user equipment 100 may request the RSS gateway 210 to register place information via an XML request message. The RSS reader inserts a place update tag (e.g., <updatePlace> tag) into the XML request message and then, based on the place update tag, sends a request for registration of place information to the RSS gateway 210. The place update tag contains place information for each RSS URL in a given format. Table 1 above is an example of the XML request message containing such update tags.

In response to a request for registration of place information from the user equipment 100, the RSS gateway 210 registers place information received from the user equipment 100 in its own database in step 205. The RSS gateway 210 may recognize the user equipment 100 through a given authentication procedure for the user equipment 100 and may also find place information through the <updatePlace> tag. The RSS gateway 210 may register place information for the recognized user equipment 100. The RSS gateway 210 may register a large amount of place information for each of the user equipment. Additionally, the RSS gateway 210 may register coordinate values of the actual location mapped to the place information. The RSS gateway 210 may have customized database data depending on a user's location.

The user equipment 100 sends an update request message for requesting RSS content updates to the RSS gateway 210 in step 207. After receiving the update request message from the user equipment 100, the RSS gateway 210 sends a request for location information about the user equipment 100 to the location server 230 in step 209. The location information may be a Home Location Register (HLR) or Secure User Place Location (SUPL). The RSS gateway 210 may further send identification information about the user equipment 100. The location server 230 recognizes the user equipment 100 through the received identification information and acquires the location information about the user equipment 100 by tracing the location of the user equipment 100. In step 211, the location server 230 sends the acquired location information to the RSS gateway 210.

After receiving the location information about the user equipment 100 from the location server 230, the RSS gateway 210 compares the received location information with the registered place information for the user equipment 100 in step 213. The RSS gateway 210 determines whether the location of the user equipment 100 coincides with one of the appointed places. If the received location information coincides with the registered place information, the RSS gateway 210 sends a request for an RSS content update to the RSS content server 300 that has a URL associated with that place in step 215. For example, if the place information is "Home", the RSS gateway 210 requests an update of content A from the RSS content server 300 of the site A mapped together with "Home".

After receiving an update request from the RSS gateway 210, the RSS content server 300 performs an update of requested RSS content (e.g., content A) in step 217. The RSS content server 300 sends RSS content update information to the user equipment 100. The RSS content server 300 may perform an update process at regular intervals or as soon as an update request is received. When receiving updated RSS content information from the RSS content server 300, the user equipment 100 performs an update of the RSS content and then displays update information on a screen through the RSS reader in step 219.

Figure 3:
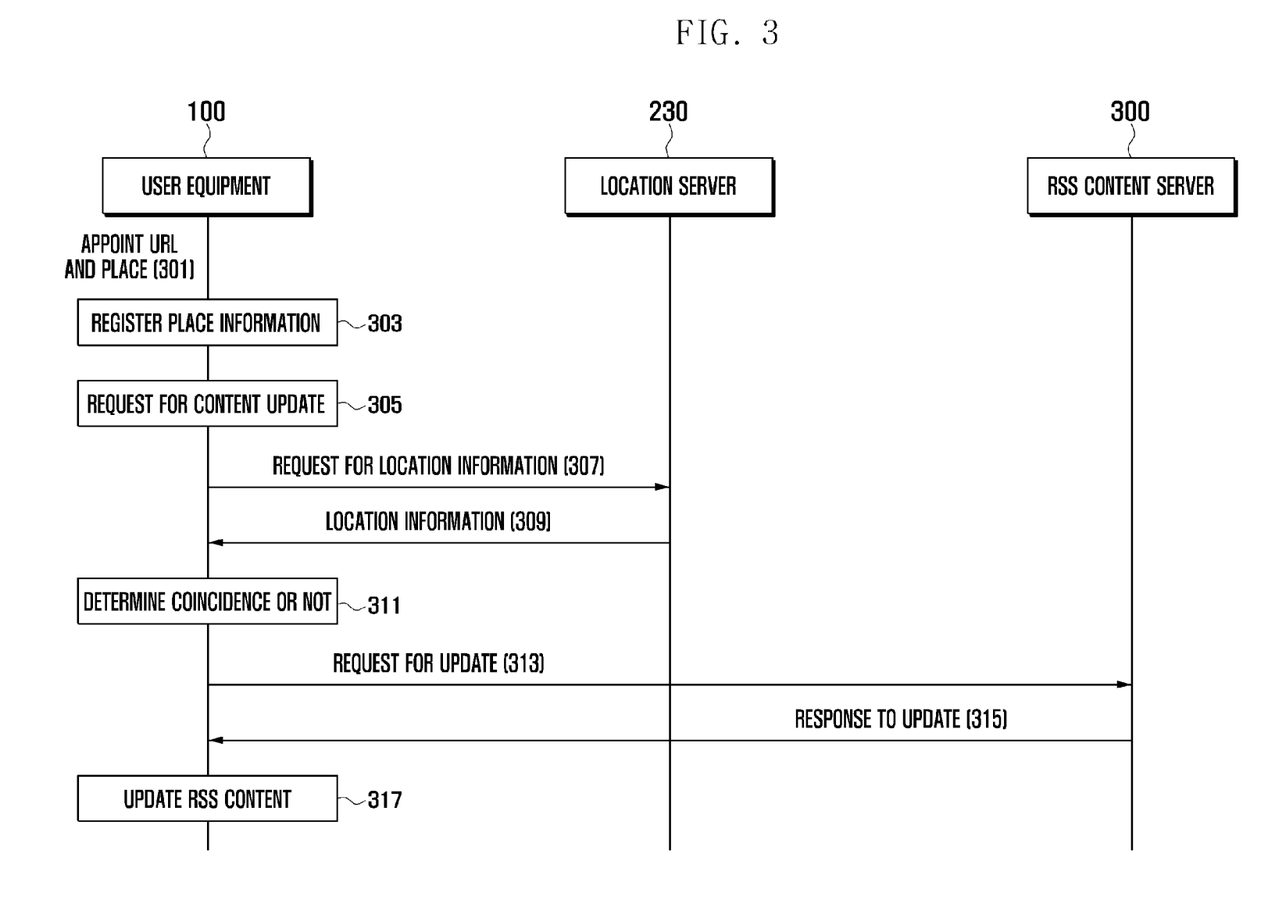
FIG. 3 is a flow diagram illustrating a method for a location-based update of RSS content in accordance with an exemplary embodiment of the present invention.

FIG. 3 is a flow diagram illustrating a method for a location-based update of RSS content according to an exemplary embodiment of the present invention.

Referring to FIG. 3, a process is shown of providing a location-based RSS content update service through the user equipment 100, the location server 230, and the RSS content server 300, without the RSS gateway 210 discussed above with respect to FIG. 2. The comparison of the place information and the location information may instead be performed in the user equipment 100. Accordingly, the user equipment 100 has a database (not shown) for registering information related to RSS content updates.

The process includes appointing places for each RSS URL in step 301, registering place information in step 303, requesting a location-based update of RSS content in step 305, acquiring location information about the user equipment 100 in steps 307 and 309, comparing the acquired location information with the registered place information in step 311, requesting an RSS content update from a specific URL site containing RSS content to be updated when the location information coincides with the place information in step 313, and performing an RSS content update for the user equipment 100 in steps 315 and 317. In addition, the process may further include a step of displaying RSS content update information through the RSS reader after RSS content is updated.

In step 301, the user equipment 100 having the RSS reader appoints a place for receiving an update for each RSS URL. For each RSS URL, the user equipment 100 may select content to be updated, designate place information for updating the selected content, and then save the selection and place information in the RSS reader. The specification format may be similar to the format discussed above with respect to FIG. 2.

In response to the user's request, the user equipment 100 registers place information in its own database in step 303. The RSS reader of the user equipment 100 may register the place information for each RSS URL in a given format such as "RSS URL: Site A, RSS Content: Content A, Location: Home". The RSS reader may register a large amount of RSS content for single place information. Additionally, the user equipment 100 may register coordinate values of the actual location mapped to the place information.

The user equipment 100 receives a request for a content update from the user in step 305 and then sends a request for location information about the user equipment 100 to the location server 230 in step 307. The user equipment 100 may further send its own identification information. The location server 230 recognizes the user equipment 100 through the received identification information and acquires the location information about the user equipment 100 by tracing the location of the user equipment 100. The location server 230 sends the acquired location information to the user equipment 100 in step 309.

After receiving the location information from the location server 230, the user equipment 100 compares the received location information with the registered place information in step 311. The user equipment 100 determines whether its own location coincides with one of the appointed places. If the received location information coincides with the registered place information, the user equipment 100 sends a request for an RSS content update to the RSS content server 300 that has URL designated with that place in step 313. For example, if the place information is "Home", the user equipment 100 requests an update of content A from the RSS content server 300 of the site A mapped together with "Home".

After receiving an update request from the user equipment 100, the RSS content server 300 performs an update of requested RSS content (e.g., content A) in step 315. The RSS content server 300 sends RSS content update information to the user equipment 100. The RSS content server 300 may perform an update process at regular intervals or as soon as an update request is received. When receiving updated RSS content information from the RSS content server 300, the user equipment 100 performs an update of the RSS content and then displays update information on a screen through the RSS reader in step 317.

Figure 4:
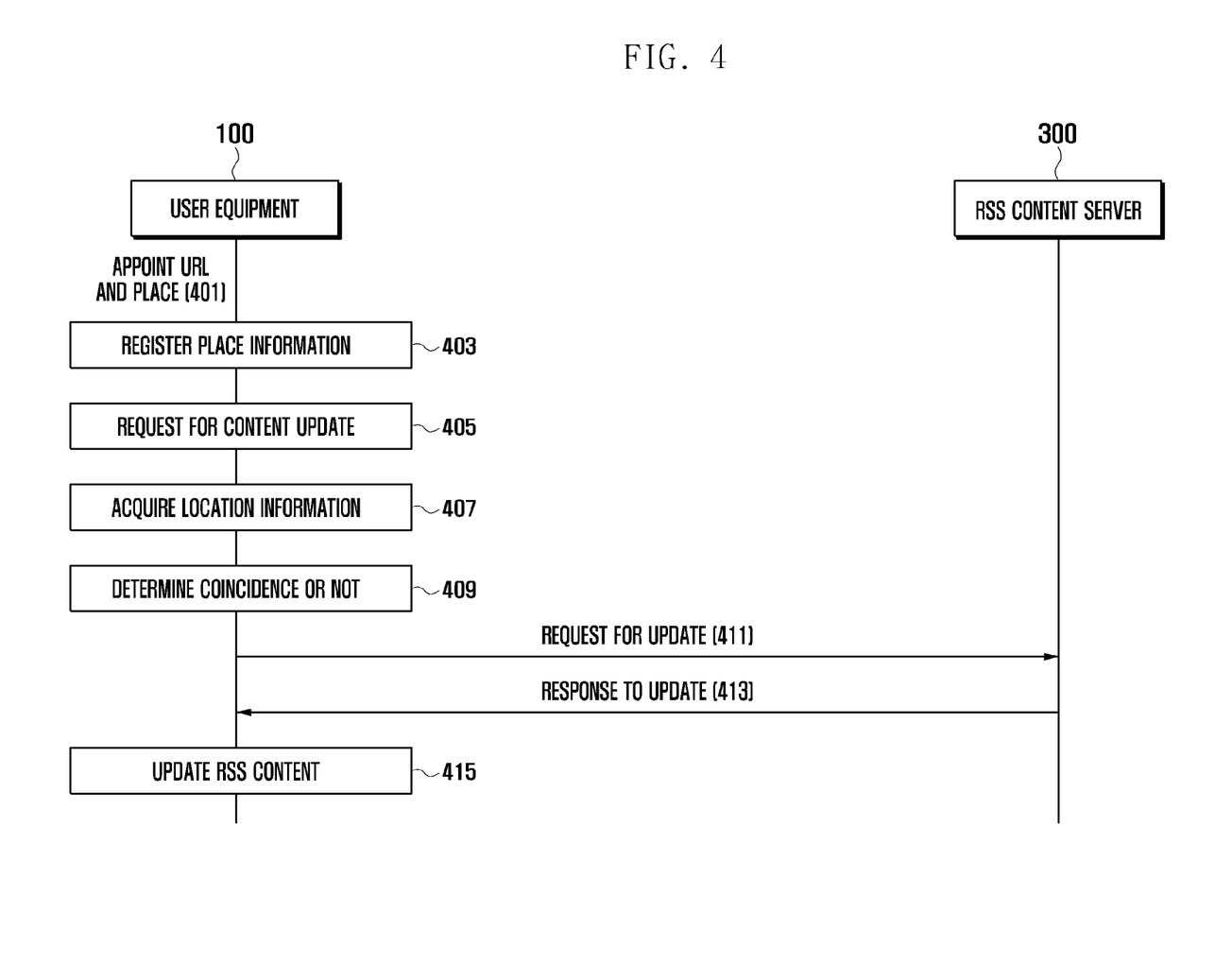
FIG. 4 is a flow diagram illustrating a method for a location-based update of RSS content in accordance with an exemplary embodiment of the present invention.

FIG. 4 is a flow diagram illustrating a method for a location-based update of RSS content according to an exemplary embodiment of the present invention.

Referring to FIG. 4, a process is shown of providing a location-based RSS content update service through the user equipment 100 and the RSS content server 300, without the RSS gateway 210 and the location server 230 discussed earlier. The comparison of the place information and the location information may be performed in the user equipment 100. Therefore, the user equipment 100 has a database for registering information related to RSS content updates. The user equipment 100 may further include a location information receiver such as a GPS (Global Positioning System) module for acquiring its own location information or an application for processing a sequence for acquiring location information through the triangulation, etc. The user equipment 100 may acquire the location information by itself.

The process includes appointing places for each RSS URL in step 401, registering place information in step 403, requesting a location-based update of RSS content in step 405, acquiring location information about the user equipment 100 in step 407, comparing the acquired location information with the registered place information in step 409, requesting an RSS content update from a specific URL site containing RSS content to be updated when the location information coincides with the place information in step 411, and performing an RSS content update for the user equipment 100 in steps 413 and 415. The process may further include displaying RSS content update information through the RSS reader after RSS content is updated.

In step 401, the user equipment 100 having the RSS reader appoints a place for receiving an update for each RSS URL. For each RSS URL, the user equipment 100 may select content to be updated, designate place information for updating the selected content, and then save them in the RSS reader. The format of this information may be similar to the format discussed above with respect to FIG. 2.

In step 403, the user equipment 100 registers place information in its own database. The RSS reader of the user equipment 100 may register the place information for each RSS URL in a given format such as "RSS URL: Site A, RSS Content: Content A, Location: Home". The RSS reader may register a large amount of RSS content for single place information. The user equipment 100 may register coordinate values of the actual location mapped to the place information.

The user equipment 100 receives a request for a content update from a user in step 405 and then acquires its own location information based on GPS information or a triangulation technique in step 407. The user equipment 100 compares the acquired location information with the registered place information in step 409. The user equipment 100 determines whether its own location coincides with one of the appointed places. If the acquired location information coincides with the registered place information, the user equipment 100 sends a request for an RSS content update to the RSS content server 300 that has a URL associated with that place in step 411. For example, if the place information is "Home", the user equipment 100 requests an update of content A from the RSS content server 300 of the site A mapped together with "Home".

After receiving an update request from the user equipment 100, the RSS content server 300 performs an update of requested RSS content (e.g., content A) in step 413. The RSS content server 300 sends RSS content update information to the user equipment 100. The RSS content server 300 may perform an update process at regular intervals or as soon as an update request is received. When receiving updated RSS content information from the RSS content server 300, the user equipment 100 performs an update of the RSS content and then displays update information on a screen through the RSS reader in step 415.

Figure 5:
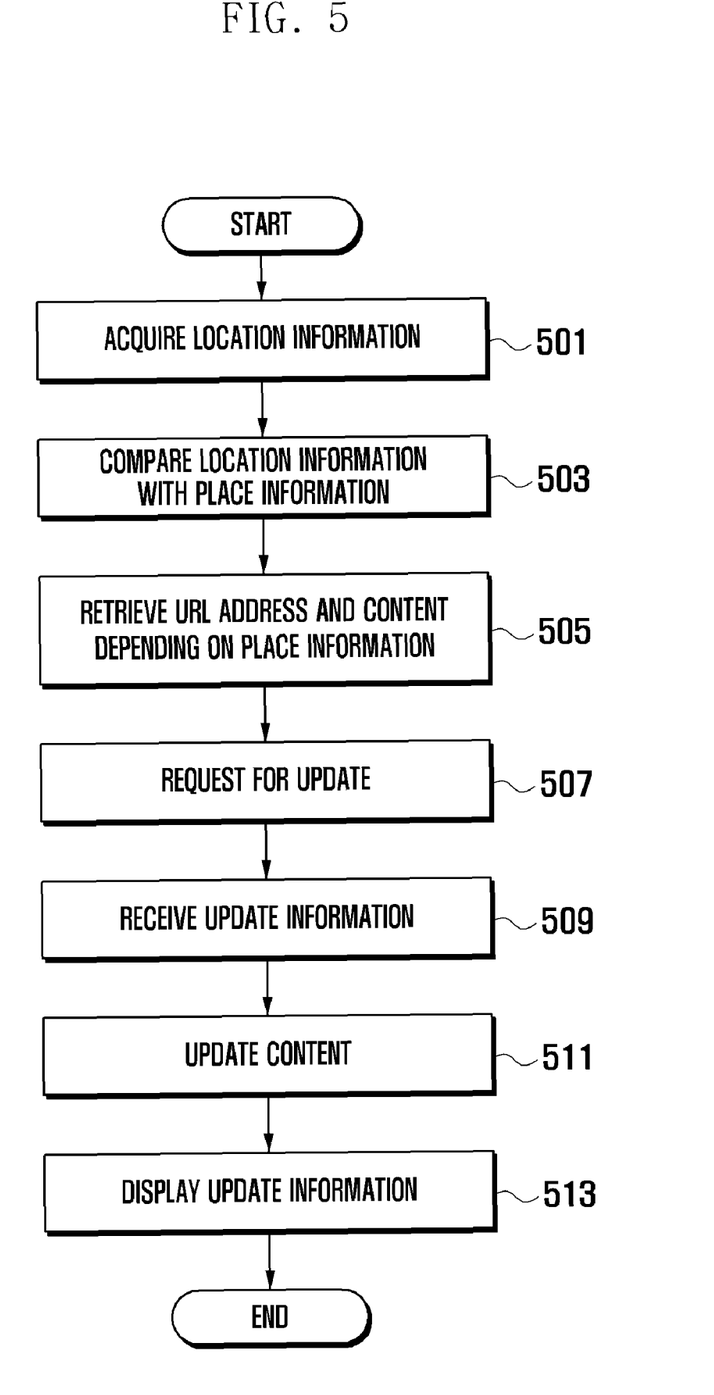
FIG. 5 is a flow diagram illustrating a control process of user equipment in accordance with an exemplary embodiment of the present invention.

FIG. 5 is a flow diagram illustrating a control process of user equipment according to an exemplary embodiment of the present invention.

In step 501, the user equipment 100 acquires the location information thereof in a given manner. The location information may be acquired at a predefined interval or at a user's request. The user equipment 100 may acquire the location information through a location information receiver or based on triangulation technique in a relevant network.

When receiving the location information, the user equipment 100 compares the acquired location information with the registered place information in step 503. Depending on the place information, the user equipment 100 retrieves RSS content update information such as RSS URS and RSS content in step 505. For example, the user equipment 100 may select "site A" and "content A" in connection with the place information. A large amount of RSS URLs and RSS content may be selected. Specific place information may be connected to a large amount of RSS content update information.

The user equipment 100 sends a request for an RSS content update to the RSS content server 300 that has the selected RSS URL in step 507. Then the user equipment 100 receives RSS content update information from the RSS content server 300 in step 509 and performs an update process of the selected RSS content according to a given update algorithm in step 511. The user equipment 100 displays update information related to the RSS content update on a screen through the RSS reader in step 513. An exemplary construction of the user equipment 100 is described below with respect to FIG. 6. The following configuration of the user equipment 100 is, however, exemplary only and not to be considered as a limitation of this invention.

Figure 6:
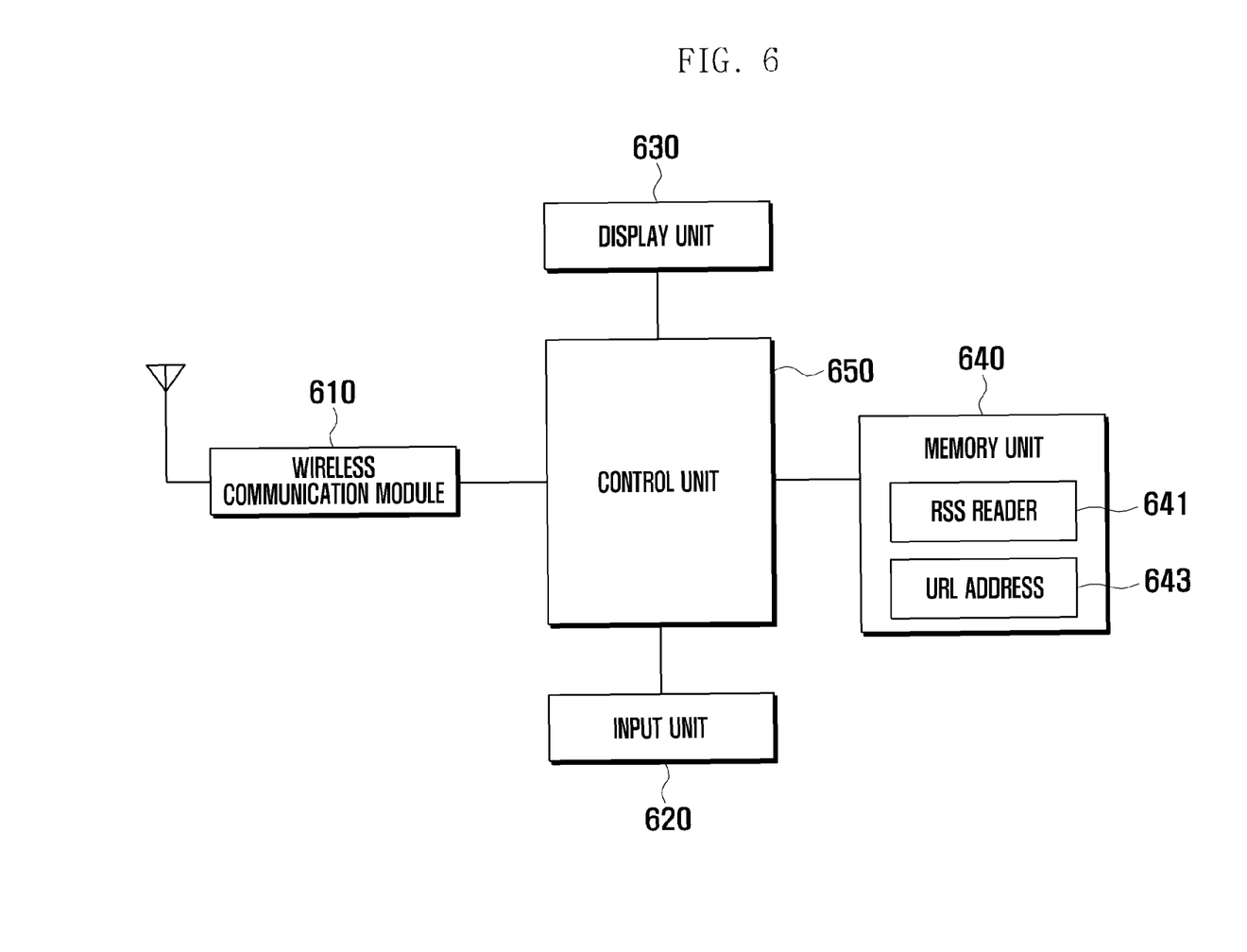
FIG. 6 is a block diagram illustrating the configuration of user equipment in accordance with an exemplary embodiment of the present invention.

FIG. 6 is a block diagram illustrating the configuration of user equipment according to an exemplary embodiment of the present invention.

Referring to FIG. 6, the user equipment 100 includes a wireless communication module 610, an input unit 620, a display unit 630, a memory unit 640, and a control unit 650.

The wireless communication module 610, also referred to as a radio frequency (RF) unit, performs a communication process of the user equipment 100. The wireless communication module 610 establishes a given communication channel with an available network (including the base station, the RSS gateway, the RSS content server, etc.) under the control of the control unit 650 and then transmits and receives signals related to a wireless communication, such as a voice call and a video call, and related to a data communication, such as Short Message Service (SMS), Multimedia Messaging Service (MMS) and Internet. The wireless communication module 610 may include a transmitter that upwardly converts the frequency of signals to be transmitted and amplifies the signals, and a receiver that amplifies received signals with low-noise and downwardly converts the frequency of the received signals. The wireless communication module 610 sends and receives data through a communication channel formed with the RSS gateway 210 and the RSS content server 300 as discussed in FIGS. 1 to 5. A communication channel may include a mobile communication channel such as Code Division Multiple Access (CDMA), Time Division Multiple Access (TDMA), Orthogonal Frequency Division Multiple Access (OFDMA), and the like, and an Internet communication channel such as a wired Internet network and a wireless Internet network.

The input unit 620 creates an input signal for entering letters and numerals and an input signal for setting or controlling functions of the user equipment 100, and then delivers them to the control unit 650. The input unit 620 includes a plurality of input keys and function keys to create such input signals. The function keys may have navigation keys, side keys, shortcut keys, and other special keys defined to perform particular functions. The input unit 620 may be formed of one or a combination of a touchpad, a touch screen, a keypad with a normal key layout, and a keypad with a QWERTY layout. The input unit 620 may create input signals for entering place information, time information, and URL information in connection with RSS content updates and then transmit the input signals to the control unit 650.

The display unit 630 represents a variety of information inputted by a user or offered to a user, including various screens activated by execution of functions of the user equipment 100. For example, the display unit 630 may visually output a boot screen, an idle screen, a menu screen, a list screen, a play screen, a content update screen, and the like. The display unit 630 may be formed of Liquid Crystal Display (LCD), Organic Light Emitting Diodes (OLED), or an equivalent. The display unit 630 may be formed of a touch screen that acts together as input and output units. When the RSS reader 641 stored in the memory unit 640 is activated, the display unit 630 may display update information about content available at a site selected by the RSS reader.

The memory unit 640 may be composed of Read Only Memory (ROM) and Random Access Memory (RAM). The memory unit 640 stores a variety of data created and used in the user equipment 100, including data produced when particular functions are performed such as music data, image data, broadcast data, photo data, message data, etc.; data received from external entities such as the RSS content server, other user equipment, a personal computer, etc.; and applications required for directly performing particular functions or menus. In addition, the memory unit 640 may store a specific application such as the RSS reader 641 related to RSS content updates, and a URL address 643 such as RSS URL of the RSS content server.

The memory unit 640 stores content updated by the RSS reader 641. The RSS reader 641 contains a previously registered address of the RSS content server 300 in order to obtain update information from the RSS content server 300. For example, a user of the user equipment 100 may register a desired site address in the RSS reader 641, so that the RSS reader 641 can check and download updated information from a selected site without accessing that site each time. Mobile communication operators in the mobile communication system 200 may fabricate and distribute the RSS reader 641 adapted to the user equipment 100. When accessing the RSS content server 300, the user equipment 100 may download the RSS reader 641 from the RSS content server 300 and then install it therein.

The memory unit 640 offers the URL address 643 to the control unit 650 when the URL address 643 is called under the control of the control unit 650. The memory unit 640 offers the RSS reader 641 to the control unit 650 when the RSS reader 641 is called under the control of the control unit 650. The memory unit 640 may include at least one buffer that temporarily store data produced while functions are performed. For example, the memory unit 640 may perform a given sized buffering for various data (e.g., content, etc.) used in RSS content updates. The memory unit 640 may be internally formed in the user equipment 100 or externally attached such as a smart card. Many kinds of internal/external storage may be used for the memory unit 640, such as RAM, ROM, a flash memory, a multi-chip package memory, and the like.

The control unit 650 performs control functions for the user equipment 100 and also controls the flow of signals in respective elements of the user equipment 100. The control unit 650 controls the signal flow among the wireless communication module 610, the input unit 620, the display unit 630, and the memory unit 640.

The control unit 650 controls processes related to RSS content updates based on location information as discussed earlier with reference to FIGS. 1 to 5. The memory unit 650 controls the activation of the RSS reader 641, the download of updated content and update information through the RSS reader 641, and the display of the downloaded content and information through the display unit 630. The control unit 650 controls the registration of place information and controls a process of determining whether location information coincides with place information. For a location-based update of RSS content, the control unit 650 controls transmission and reception of data to and from the RSS gateway 210, the location server 230 and the RSS content server 300. For the RSS content updates, the control unit 650 controls the display of update information on the display unit 630 through the RSS reader 641.

Furthermore, the control unit 650 may include a location information receiver such as a GPS module, or a specific unit suitable for acquiring location information about the user equipment 100 via a triangulation technique. For example, when the user equipment 100 includes the location information receiver, the control unit 650 may acquire location information about the user equipment 100 by controlling the location information receiver. When the user equipment 100 does not include the location information receiver, the control unit 650 may acquire location information about the user equipment 100 by controlling the specific unit via the triangulation technique.

Where appropriate, the above-discussed control functions of the control unit 650 may be realized by software. Although the user equipment 100 is schematically illustrated in FIG. 6, this is exemplary only and not to be considered as a limitation of the present invention.

The control unit 650 may further include a baseband module for a mobile communication server of the user equipment 100. In this case, the baseband module may be installed in both or one of the control unit 650 and the wireless communication module 610.

The above-discussed user equipment 100 may include other elements not illustrated in FIG. 6. For example, the user equipment 100 may further include a location information receiver such as a GPS module, a location information acquisition module using GPS or a triangulation technique, a short distance communication module, a digital camera module, a wired or wireless data transmission interface, an Internet access module, an audio processing unit, a digital broadcast receiving module, and the like. According to a digital convergence tendency today, elements of the user equipment 100 may be varied, modified and improved in various ways, and other elements equivalent to the above elements may be additionally or alternatively equipped in the user equipment 100. As will be understood by those skilled in the art, some of the above-mentioned elements in the user equipment 100 may be omitted or replaced with another.

Additionally, the user equipment 100 may include communication devices, multimedia players and their application equipment, especially including many mobile communication terminals based on various communication protocols, a Portable Multimedia Player (PMP), a digital broadcasting player, a Personal Digital Assistant (PDA), a music player (e.g., an MP3 player), a portable game console, a smart phone, a notebook, a handheld personal computer, and the like.

As described above, a method and apparatus according to exemplary embodiments of the present invention may not only allow a conventional time-based update of RSS content, but also allow a location-based update of RSS content. By offering a location-based, user-customized RSS service, exemplary embodiments of the present invention may enhance the usability and usefulness of RSS and expand personalized services. Exemplary embodiments of the present invention may improve user's convenience and the utilization of information in RSS content updates.

The above-described methods according to the present invention can be realized in hardware or as software or computer code that can be stored in a recording medium such as a CD ROM, an RAM, a floppy disk, a hard disk, or a magneto-optical disk, so that the methods described herein can be rendered in such software using a general purpose computer, or a special processor or in programmable or dedicated hardware, such as an ASIC or FPGA. As would be understood in the art, the computer, the processor, or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

While the invention has been shown and described with reference to certain exemplary embodiment thereof, it will be understood by those skilled in the art that various changes in form and details may be made therein without departing from the spirit and scope of the invention as defined by the appended claims and their equivalents.

What is claimed is:

1. A method for updating RSS content, the method comprising:
    appointing place information for an update of content for each RSS Uniform Resource Locator (URL) at user equipment;
    acquiring location information about the user equipment;
    selecting RSS content to be updated based on the place information when the acquired location information coincides with the appointed place information; and
    performing an update of the selected RSS content,
    wherein the selecting of the RSS content to be updated includes:
        comparing the acquired location information with the place information;
        retrieving place information coinciding with the location information;
        retrieving a URL address and RSS content mapped to the place information coinciding with the location information; and
        sending a request for an update of the RSS content to the URL address.

2. The method of claim 1, wherein the appointing of the place information includes saving at least one discernible place information in the user equipment.

3. The method of claim 2, further comprising:
    designating the place information with a place update tag together with update content information for each RSS URL.

4. The method of claim 2, wherein the acquiring of the location information includes acquiring the location information by the user equipment at regular intervals or acquiring the location information from an external entity at a user's request for an RSS content update.

5. An apparatus for updating RSS content, the apparatus comprising:
    a memory unit for storing an RSS reader, a Uniform Resource Locator (URL) address of an RSS server, and at least one place information associated with each URL address of the RSS server; and
    a control unit for acquiring location information about user equipment, for determining whether the acquired location information coincides with the appointed place information, for retrieving a URL address and RSS content mapped to the place information coinciding with the location information, and for sending a request for an RSS content update to the URL address of the RSS content mapped to the place information.

6. An apparatus comprising:
    a storage unit for storing an RSS reader;
    a control unit for acquiring location information identifying a current location of the apparatus, for determining whether the location information corresponds with previously stored place information, and when the location information corresponding with the previously stored place information, for retrieving a Uniform Resource Locator (URL) address and RSS content mapped to the place information and for sending a request for updated RSS content to the URL address corresponding to the previously stored place information; and
    a display unit for displaying the updated RSS content retrieved from the URL address via the RSS reader.

7. The apparatus of claim 6, further comprising:
    a location information determining unit for determining the location information of the apparatus,
    wherein the control unit acquires the location information from the location information determining unit.

8. The apparatus of claim 6, wherein the control unit acquires the location information from an external location server.

9. The apparatus of claim 6, wherein the storage unit stores the URL address and the previously stored place information.

10. The apparatus of claim 9, wherein the storage unit stores a plurality of URL addresses and a plurality of place information, and each of the plurality of URL addresses corresponds to one or more of the place information.

11. A system for providing location-based RSS content, the system comprising:

user equipment for registering place information corresponding to a Uniform Resource Locator (URL) for RSS content, for requesting the location-based RSS content and for presenting the location-based RSS content; and an RSS gateway for receiving the place information from the user equipment, for determining a current location of the user equipment, for comparing the place information with the current location, and when the registered place information corresponds to the current location, for retrieving a URL address mapped to the registered place information coinciding with the location information and requesting RSS content via the URL corresponding to the registered place information.

12. The system of claim 9, further comprising:

an RSS content server corresponding to the URL, for receiving the request for the RSS content from the RSS gateway and for transmitting the RSS content to the user equipment.

* * * * *